United States Patent [19]

Hosono et al.

[11] Patent Number: 5,392,165
[45] Date of Patent: Feb. 21, 1995

[54] APPARATUS FOR RECORDING AUDIO AND VIDEO SIGNALS

[75] Inventors: Yukiharu Hosono; Yukihiko Haikawa, both of Higashihiroshima, Japan

[73] Assignee: Sharp Kabushiki Kaisha, Osaka, Japan

[21] Appl. No.: 834,870

[22] Filed: Feb. 13, 1992

[30] Foreign Application Priority Data

Mar. 29, 1991 [JP] Japan ................... 3-067159

[51] Int. Cl.⁶ .............................................. G11B 5/02
[52] U.S. Cl. ............................. 360/19.1; 358/341
[58] Field of Search ................... 360/19.1, 64, 33.1, 360/48, 61, 18, 22; 358/335, 341, 343

[56] References Cited

U.S. PATENT DOCUMENTS

| | | | |
|---|---|---|---|
| 4,751,590 | 6/1988 | Wilkinson | 360/19.1 |
| 4,758,911 | 7/1988 | Nakano et al. | 360/19.1 X |
| 4,816,928 | 3/1989 | Sasaki et al. | 360/19.1 X |
| 4,819,089 | 4/1989 | Wilkinson et al. | 360/19.1 X |
| 4,914,527 | 4/1990 | Asai et al. | 360/19.1 X |
| 4,920,424 | 4/1990 | Hosaka et al. | 360/19.1 X |
| 5,012,352 | 4/1991 | Yoshimura et al. | 360/19.1 X |
| 5,121,259 | 6/1992 | Yamashita | 360/19.1 |
| 5,150,218 | 9/1992 | Ezaki | 360/19.1 X |
| 5,233,478 | 8/1993 | Kanota | 360/21 |

FOREIGN PATENT DOCUMENTS

| | | |
|---|---|---|
| 4019651A1 | 1/1991 | Germany . |
| 61-80670 | 4/1986 | Japan . |
| 62-65575 | 3/1987 | Japan . |
| 2-149991 | 6/1990 | Japan . |
| 2-161661 | 6/1990 | Japan . |

*Primary Examiner*—Andrew L. Sniezek
*Attorney, Agent, or Firm*—Nixon & Vanderhye

[57] ABSTRACT

It is an object of the present invention to provide a data recording apparatus which is designed to allow compatability to other recording and reproducing apparatus and is capable of readily performing the additional recording or rewriting of data. Channels ch1 and ch2 are used as a channel for video data; and channels ch3 and ch4 as a channel for audio data. During the recording of video data, the channels ch3 and ch4 are made to be null. On the other hand, during the recording of audio data, the channels ch1 and ch2 are made to be null. Accordingly, the rewriting of the recorded video data or audio data as required can be easily performed. Besides, where recording is performed only on either the channels for video data or the channels for audio data, recording areas are secured for the other channels so that after-recording (additional recording) is easily performed.

14 Claims, 5 Drawing Sheets

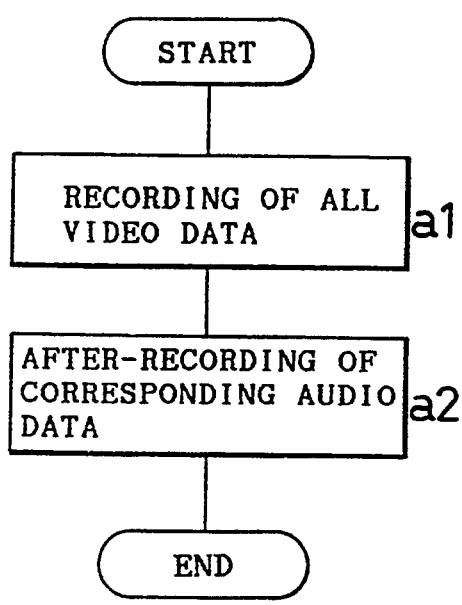 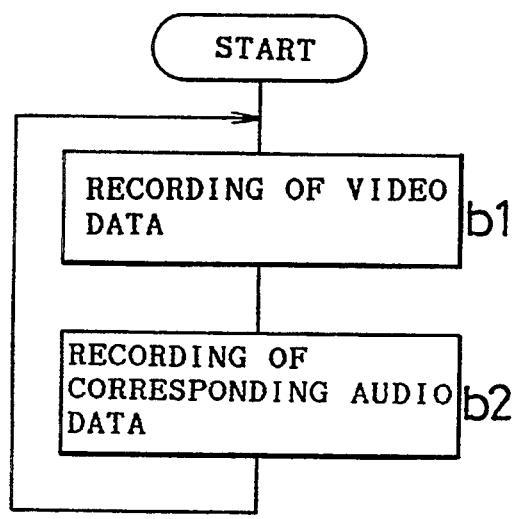
Fig. 3(1)      Fig. 3(2)

Fig. 4 (1)

| ch1,2 | VIDEO DATA V1 | | VIDEO DATA V2 | | VIDEO DATA V3 | |
|---|---|---|---|---|---|---|
| ch3,4 | * | * | * | * | * | * |

| ch1,2 | VIDEO DATA V1 | * | VIDEO DATA V2 | * | VIDEO DATA V3 | * |
|---|---|---|---|---|---|---|
| ch3,4 | * | AUDIO DATA A1 | * | AUDIO DATA A2 | * | AUDIO DATA A3 |

| ch1,2 | * | * | * | * | * | * |
|-------|---|---|---|---|---|---|
| ch3,4 | AUDIO DATA A1 | | AUDIO DATA A2 | | AUDIO DATA A3 | 12 |

Fig. 5(2)

| ch1,2 | VIDEO DATA V1 | * | VIDEO DATA V2 | * | VIDEO DATA V3 | * |
|-------|---------------|---|---------------|---|---------------|---|
| ch3,4 | * AUDIO DATA A1 | * | * AUDIO DATA A2 | * | * AUDIO DATA A3 | 12 |

APPARATUS FOR RECORDING AUDIO AND VIDEO SIGNALS

BACKGROUND OF THE INVENTION

1. Field Of The Invention

The present invention relates to a data recording apparatus suitably used for digital audio tape recorder (DAT) and similar devices for the recording and reproduction of video and audio signals in the form of digital data on a magnetic tape as the magnetic recording medium.

2. Description Of The Prior Art

As a conventional recording reproducing apparatus there is known a digital audio tape recorder (DAT) in which an audio signal including a sound signal is converted into a digital signal for recording upon a magnetic tape. The audio signal is reproduced by converting the digital signal thus recorded upon a magnetic tape into the original audio signal. Some DATs of the type described above selection of an operating mode, either a two-channel mode in which two channels are set on a magnetic tape for individually recording thereon two kinds of audio signals or a four-channel mode in which four channels are set on a magnetic tape for individually recording thereon four kinds of audio signals.

For example, in a two-channel mode, the two kinds of audio signals corresponding respectively to two loudspeakers arranged in each of and on the right and left of an audience are recorded on the magnetic tape. In the case of a four-channel mode, the four kinds of audio signals correspond respectively to four loudspeakers arranged both in front of and behind as well as on the right and left of an audience are recorded on the magnetic tape.

Further, in the four-channel mode, there is also known in the art a DAT which employs a method for recording an audio signal in two of the four channels and a static video signal in the other two channels, allowing recorded audio and video signals to be reproduced from a single magnetic tape at the same time.

FIG. 1 is a view of a format of a magnetic tape 31 having thereon each of video data and audio data recorded in the four-channel mode. As shown in FIG. 1, audio data A are recorded continuously while video data V1 through V4 are intermittently recorded. When magnetic tape 31 is reproduced, a so-called presentation system capable of inserting a voice-over for every static picture can be realized.

JP-A 2-149991 (1990) discloses a recording apparatus for recording an video data and an audio data respectively upon a magnetic tape through the two-channel mode. In such a data recording and reproducing apparatus, the recording area for each of video and audio data is pre-set. Then, the video data or the audio data is recorded in each area.

In a recording and reproducing apparatus for recording data on the magnetic tape 31 having the format of FIG. 1, it is not possible to performing rewriting or "after-recording" (to record additional data to the recording medium) of an video data alone (or an audio data alone).

In the data recording and reproducing apparatus disclosed in JP-A 2-149991 (1990), the data are recorded on the magnetic tape using an original format of the apparatus, which leads to the problem of compatibility with other apparatus. In addition to this disadvantage, video data are separately recorded from the audio data even where the rewriting or after-recording of the data is not required. Because of this, it is necessary to prepare a memory for each of the video and the audio data where continuous and simultaneous reproduction of the data is required. Consequently, built-in memory in the data recording and reproducing apparatus must have relatively large capacity which also increases the size of the apparatus.

SUMMARY OF THE INVENTION

It is a principal object of the invention to provide a data recording apparatus which allows compatibility to other data recording apparatus and permits easy rewriting and "after-recording" of data.

The invention provides a data recording apparatus for simultaneously recording four kinds of data on a recording medium through four channels wherein two of the four channels are used for an audio signal and the other two channels are used for a video signal. At the time either one of the audio signal channel or the video signal channel is being recorded, no recording on the other channel is performed.

According to the invention, the recording of a video signal is not performed when an audio signal is being recorded. To the contrary, when a video signal is recorded, the recording of an audio signal is not performed. Therefore, in the event of rewriting the recorded signals on a recording medium, the rewriting of a desired channel is easily carried out because no signal is recorded on any channel other than the very channel to be rewritten.

Besides, by intermittently recording only a video signal on the one channel and by recording an audio signal in the form of a non-signal on the other channel between the video signals intermittently recorded, it is possible to perform additional recording, or a so-called "after-recording", of audio signals after completing the video signal recording.

In addition to the above, the recording medium, having thereon video and audio signals which are recorded by the data recording apparatus of the invention, can be similarly used for other four-channel type data recording and reproducing apparatus for the rewriting, additional recording (after-recording) and reproduction of the signals. Because of this benefit, the utility range of the data recording apparatus in accordance with the invention is remarkably extended.

As described above, according to the invention, in the event of rewriting the recorded signals of a recording medium, the rewriting of a desired channel is easily carried out because no signal is recorded on any channel other than the very channel to be rewritten.

Further, by intermittently recording a signal on only one channel and by recording a non-signal on the other channel between the signals intermittently recorded, it is possible to perform an additional recording, or a so-called "after-recording" of an audio signal after completing the video signal recording.

Still more, the recording medium, having thereon video and audio signals which are recorded by the data recording apparatus of the invention, can be similarly used for other four-channel type data recording and reproducing apparatus for the rewriting, additional recording (after-recording) and reproduction of the signals. Because of this benefit, the utility range of the data recording apparatus in accordance with the invention is remarkably extended.

The data recording apparatus in accordance with the invention is characterized in that a plurality of video data are intermittently recorded on a channel for video signals and that thereafter, audio data are recorded on recording areas on a channel for audio signals, the aforesaid recording areas corresponding to other recording areas on the channel for the video signals where no video signal is recorded.

Furthermore, the data recording apparatus according to the invention is characterized in that a plurality of audio data are intermittently recorded on a channel for audio signals and that thereafter, video data are recorded on recording areas on a channel for video signals, the aforesaid recording areas corresponding to other recording areas on the channel for the audio signals where no audio signal is recorded.

Still more, the invention provides a data recording apparatus for performing a four-channel recording for the simultaneous recording of four kinds of data on a recording medium, the data recording apparatus comprising audio data recording means for recording an audio data on two of four channels, the two channels being fixed in advance as a channel for audio signals; video data recording means for recording a video data on the other two channels for video signals; and control means for, at the time that recording is performed by either one of the audio data recording means and video data recording means, controlling recording by the other recording means.

Furthermore, the data recording apparatus as disclosed in the invention is characterized in that, at the time that recording is performed by either one of the audio data recording means and video data recording means, a non-signal fixed in advance by the other recording means is recorded by the control means.

BRIEF DESCRIPTION OF THE DRAWINGS

Other and further objects, features, and advantages of the invention will be more explicit from the following detailed description taken with reference to the drawings wherein:

FIGS. 3(1) and 3(2) are flow charts of the recording operation of the recording and reproducing apparatus 21;

FIGS. 4(1) and 4(2) show a view of a recording format of a magnetic tape 12 having thereon data which are recorded by the recording and reproducing apparatus 21;

FIGS. 5(1) and 5(2) show another view of a recording format of a magnetic tape 12 having thereon data which are recorded by the recording and reproducing apparatus 21.

DETAILED DESCRIPTION OF THE PREFERRED EMBODIMENTS

Figure 1:
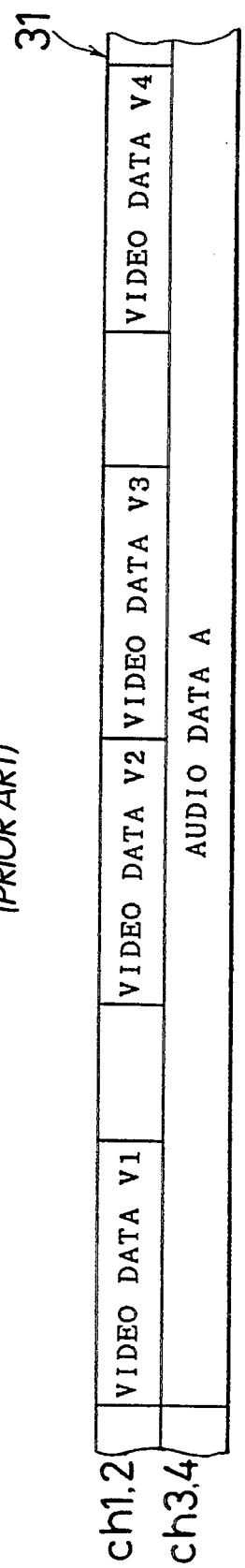
FIG. 1 is a view of a recording format of a magnetic tape 31 having thereon data which are recorded by a conventional recording and reproducing apparatus.

Now referring to the drawings, preferred embodiments of the invention are described below.

Figure 2:
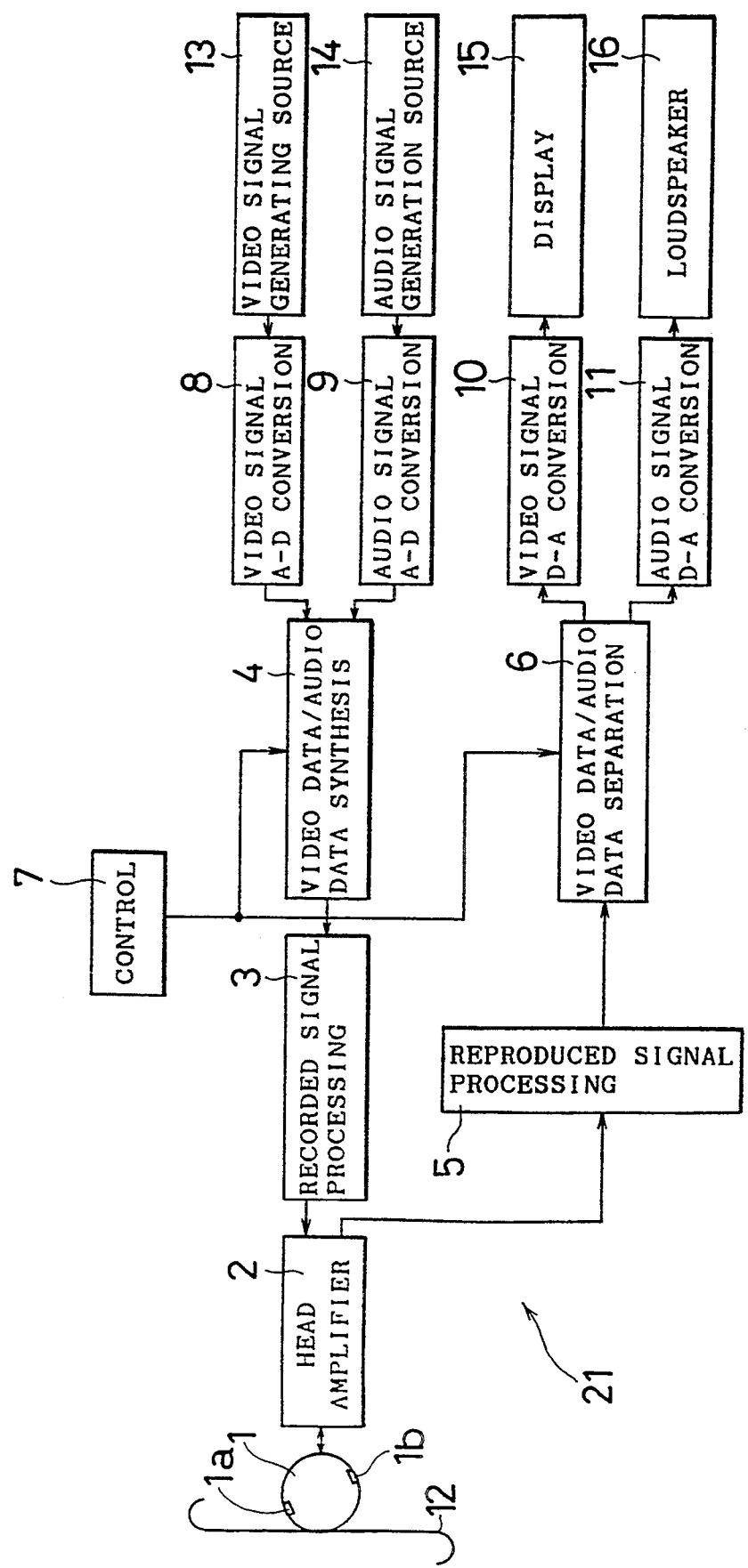
FIG. 2 is a block diagram of a principal configuration of a recording and reproducing apparatus 21 as an embodiment of invention.

FIG. 2 is a block diagram of a principal configuration of a recording and reproducing apparatus 21 as an embodiment of the invention. Like a conventional DAT, the recording and reproducing apparatus 21 has a configuration in which an audio signal input is converted into a digital signal for the recording on a magnetic tape 12 and the digital signal thus recorded on the magnetic tape 12 is, in return, converted in the original audio signal for the reproduction. With the recording and reproducing apparatus 21, it is also possible to record information for correcting an error at the same time that a recording signal is converted into a digital signal for the recording on the magnetic tape 12. Therefore, when part of a recording signal is missed, the repair of such a defect can be possible so that not only the correct reproduction of the signals but also the reproduction of the signals with little error is accomplished.

With the recording and reproducing apparatus 21, it is possible to select, as an operating mode, either a two-channel mode of having two channels set on the magnetic tape 12 for individually recording thereon two kinds of audio signals or a four-channel mode of having four channels set on the magnetic tape 12 for individually recording thereon four kinds of audio signals. In the present embodiment of the invention, the recording and reproducing apparatus 21 is set in the four-channel mode in which two of the four channels are allotted for the recording and reproduction of two kinds of audio signals while the other two channels are allotted for the recording and reproduction of static video signals.

Static video signals for one picture transferred from a video signal generating source 13 are converted through a video signal A-D conversion circuit 8 into digital video data. Thereafter the digital video data are provided to a video and audio data synthetic circuit 4. Audio signals transferred from an audio signal generating source 14, on the other hand, are converted through a audio signal A-D conversion circuit 9 into digital audio data, thereafter the digital audio data being provided to the video and audio data synthetic circuit 4. An audio signal covers a sound signal such as the sounds of music and further includes both right and left side audio signals in a stereophonic system.

The video and audio synthetic circuit 4 allots each of the digital video and audio data to each corresponding channel of the four channels for the provision to a recording signal processing circuit 3 as a serial data. Also, in the video and audio synthetic circuit 4, error correction information, including a parity check code, is added under the control of a control circuit 7.

The recorded signal processing circuit 3 modulates the data signal provided in order to transfer the same to a head amplifier 2. The data signal amplified by the head amplifier 2 are recorded on the magnetic tape 12 by means of magnetic heads 1a, 1b mounted on the peripheral surface of a rotary drum 2.

The digital data recorded on the magnetic tape 12 are read out by the magnetic heads 1a, 1b, are amplified by the head amplifier 2 and then are transferred to a reproduced signal processing circuit 5 which demodulates the reproduced signals to transfer them to a video/audio data synthesis separation circuit 6.

The video and audio data synthesis separation circuit 6 separates the reproduced signal into a video data and an audio data and also corrects an error on the basis of the error correction information. In a video signal D-A conversion circuit 10, the digital video data from the video and audio synthesis separation circuit 6 is converted into an analog video signal for the display on a display device 15 such as a CRT (cathode ray tube) screen. On the other hand, in an audio signal D-A conversion circuit 11, the digital audio data from the video and audio synthesis separation circuit 6 is converted into an analog audio signal for the conversion into audible sounds by a speaker 16.

FIG. 3 shows a flow chart of the recording operation of the recording and reproducing apparatus 21. FIG. 4 is a view of a recording format of the magnetic tape 12. With reference to FIGS. 3(1) and 4, the after-recording mode will be described. In the step a1, respective video data V1, V2, V3 . . . , Vn are intermittently recorded on channels ch1 and ch2 of the magnetic tape 2. In FIG. 4, each of null areas (or areas where no data is recorded) is represented by the symbol "**". Therefore, channels ch3 and ch4 of the magnetic tape 2 is are made to such a null area while the video data are recorded on the channels ch1 and ch2. At this time, non-signals which are equivalent to the audio data additionally recorded in a corresponding relationship with each video data are recorded on the channels ch3 and ch4.

In the step a2, audio data A1, A2, A3 . . . , An are respectively recorded on their recording areas between the video data V1, V2, V3 . . . , Vn on the channels ch3 and ch4 where non-signals are recorded. The channels ch1 and ch2 at the time that the audio data are recorded on the channels ch3 and ch4 are made to be a null area.

Next, with reference to FIGS. 3(2) and 4(2), the normal mode will be described. In the step b1, the video data V1 is recorded on the magnetic tape 12. Thereafter, in the step b2, the audio data A1 corresponding to the video data V1 is recorded on the channels ch3 and ch4 on the magnetic tape 12. Similarly, the video data V2 to the audio data A2 and the video data V3 to the audio data A3 are respectively recorded.

According to the embodiment of the invention, at the time that the video data are under recording, the recording of the audio data is not performed. Therefore, in the event of rewriting the recorded signals of the recording medium 12, the rewriting of a desired channel is easily carried out because no signal is recorded on any channel other than the very channel to be rewritten.

Besides, by intermittently recording only a video data on the channels ch1 and ch2 and by recording an audio signal in the form of a non-signal on the channels ch3 and ch4 betweem the video data intermittently recorded, it is possible to perform the additional recording (or so-called "after-recording") of an audio signal after completing the video signal recording.

Furthermore, the recording medium 12, having thereon video and audio data which are recorded by the data recording and reproducing apparatus 21 of the invention, can be similarly used for other four-channel type data recording and reproducing apparatus for the rewriting, additional recording (after-recording) and reproduction of the signals. Because of this benefit, the utility range of the data recording apparatus in accordance with the invention is remarkably extended.

FIG. 5 is a view of describing another embodiment of the invention. FIG. 5 shows a recording format for the magnetic tape 12 in which the audio data are recorded prior to the after-recording of the video data. In this embodiment, the same effects as the aforesaid embodiment are obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A data recording apparatus for performing four-channel recording for the simultaneous recording of four kinds of data on a recording medium, comprising:
   audio data recording means for recording audio signal data on two of four channels preset as audio channels;
   video data recording means for recording video signal data on the other two channels preset as video channels; and
   control means for, at the time that recording is performed by the audio data recording means, preventing recording of signal data by the video data recording means, and at the time that recording is performed by the video data recording means, preventing recording of signal data by the audio recording means.

2. A data recording apparatus as claimed in claim 1 wherein at the time that signal data recording is performed on two channels by either one of the audio data recording means and video data recording means, non-signal data are recorded on the other two channels by the other recording means.

3. An apparatus comprising:
   a recording medium;
   means for simultaneously recording different types of signals on multiple channels of the recording medium, a first set of the channels for recording audio signals and a second set for recording video signals, including:
   means for intermittently interleaving video frames of video signal data on the first set of channels and audio frames of audio signal data on the second set of channels, and
   means for preventing recording of audio signal data while video signal data are being recorded, thereby generating associated available audio recording regions and for preventing recording of video signal data while audio signal data are being recorded thereby generating associated video recording regions.

4. An apparatus according to claim 3, further comprising:
   means for selectively recording information in either of the available recording regions.

5. An apparatus according to claim 3, wherein the video frames and audio frames are alternately interleaved.

6. An apparatus according to claim 3, wherein the multiple channels include four channels with both sets of channels including two channels.

7. An apparatus according to claim 3, wherein audio signal data are selectively recorded in the available audio recording regions after recording the video signal data.

8. An apparatus according to claim 3, wherein the video signal data are selectively recorded in the available video recording regions after recording the audio signal data.

9. An apparatus according to claim 3, wherein during simultaneous recording of audio and video signal data, non-signal data are stored in the available recording regions.

10. A method of simultaneously recording audio and video signals on a four channel recording medium, each recording frame having two video channels and two audio channels, comprising:
 (a) during first intermittent frames, recording audio data on the two audio channels;
 (b) preventing recording of video data on the two video channels corresponding to the first intermittent frames;
 (c) during second intermittent frames different than the first intermittent frames, recording video data on the two video channels; and
 (d) preventing recording of audio data on the two audio channels corresponding to the second intermittent frames.

11. The method according to claim 10, further comprising:
 after step (d), selectively recording audio data on the two audio channels during one or more second intermittent frames.

12. The method according to claim 10, further comprising:
 after step (d), selectively recording video data on the two video channels during one or more first intermittent frames.

13. The method according to claim 10, wherein the first and second intermittent frames are alternately interleaved.

14. The method according to claim 10, wherein non-signal data are recorded in steps (b) and (d).

* * * * *